United States Patent
Zhang et al.

(10) Patent No.: US 7,756,147 B2
(45) Date of Patent: Jul. 13, 2010

(54) VLAN-BASED DATA PACKET TRANSMISSION AND ETHERNET BRIDGE DEVICE

(75) Inventors: Shifa Zhang, Guangdong (CN); Zhijun Qu, Guangdong (CN); Wumao Chen, Guangdong (CN); Qiao Li, Guangdong (CN)

(73) Assignee: Huawei Technologies Co., Ltd., Shenzhen, Guangdong Province (CN)

( * ) Notice: Subject to any disclaimer, the term of this patent is extended or adjusted under 35 U.S.C. 154(b) by 136 days.

(21) Appl. No.: 12/010,691

(22) Filed: Jan. 29, 2008

(65) Prior Publication Data

US 2008/0205296 A1 Aug. 28, 2008

Related U.S. Application Data

(63) Continuation of application No. PCT/CN2006/001895, filed on Jul. 28, 2006.

(51) Int. Cl.
*H04L 12/28* (2006.01)
*H04L 12/56* (2006.01)

(52) U.S. Cl. ............... 370/401; 370/395.31; 370/395.53

(58) Field of Classification Search ................. 370/237, 370/386, 388, 389, 392, 395.31, 395.53, 370/401
See application file for complete search history.

(56) References Cited

U.S. PATENT DOCUMENTS

| | | | | |
|---|---|---|---|---|
| 6,529,503 B1* | 3/2003 | Chiang et al. | | 370/363 |
| 6,975,581 B1* | 12/2005 | Medina et al. | | 370/401 |
| 2003/0189905 A1* | 10/2003 | Lee | | 370/254 |
| 2004/0008695 A1* | 1/2004 | Man | | 370/395.53 |
| 2005/0083952 A1* | 4/2005 | Swain | | 370/401 |
| 2005/0111434 A1* | 5/2005 | Halen | | 370/351 |
| 2006/0221868 A1* | 10/2006 | de Heer et al. | | 370/257 |
| 2006/0248227 A1* | 11/2006 | Hato et al. | | 709/245 |
| 2008/0205296 A1* | 8/2008 | Zhang et al. | | 370/254 |

FOREIGN PATENT DOCUMENTS

| EP | 1 381 189 A1 | 1/2004 |
|---|---|---|
| EP | 1381189 A1 * | 1/2004 |
| JP | 2003-244185 | 8/2003 |

OTHER PUBLICATIONS

International Search Report from the Chinese Patent Office for International Application No. PCT/CN2006/001895 (Nov. 30, 2006).
Extended European Search Report for European Application No. 06775240.2 including supplementary European search report and European search opinion (Oct. 6, 2008).
Kok, et al., "Simple IP Subnet VLAN Implementation", Networks, 2001, Proceedings, Ninth IEEE International Conference, pp. 160-165, (Oct. 10, 2001).

* cited by examiner

*Primary Examiner*—Steven H Nguyen
*Assistant Examiner*—Benjamin Elliott
(74) *Attorney, Agent, or Firm*—Finnegan, Henderson, Farabow, Garrett & Dunner, L.L.P.

(57) ABSTRACT

The present invention provides a VLAN-based data packet transmission method and an Ethernet bridge device. The method includes: learning a member port corresponding to a VLAN according to a data packet received by an Ethernet bridge device, and storing a correspondence between a VLAN and the learnt member port; and forwarding the data packet by the Ethernet bridge device according to the correspondence between each VLAN and its member port that is stored.

13 Claims, 2 Drawing Sheets

VLAN-BASED DATA PACKET TRANSMISSION AND ETHERNET BRIDGE DEVICE

This application is a continuation of PCT International Application No. PCT/CN2006/001895, filed Jul. 28, 2006.

TECHNICAL FIELD OF THE INVENTION

The present disclosure relates to the technical field of network communication, and in particular, to a Virtual Local Area Network based (VLAN-based) data packet transmission method and Ethernet bridge device.

BACKGROUND OF THE INVENTION

A network model of a broadband access network is shown in FIG. 1.

As shown in FIG. 1, the broadband access network system generally includes: one or more user access devices, an Ethernet bridge device, a Broadband Remote Access Server (BRAS), an Authentication, Authorization and Accounting (AAA) Server, etc. The user access devices may be, for example, a Digital Subscriber Line Access Multiplexer (DSLAM), a Local Area Network (LAN) switch (Ethernet bridge) etc. The Ethernet bridge device may be, e.g., an ATM exchange, an Ethernet bridge, etc.

The user access device implements the function of subscriber line tandem. The Ethernet bridge device couples the user access device to the BRAS. The BRAS terminates the user access link layer and cooperates with the AAA server to implement user access authentication and accounting. The user access device and the Ethernet bridge device operate in a layer-2 mode, only handle the link layer information in a data packet, and forward the packet according to the link layer address information.

As the cost of Ethernet components decreases greatly and the exchange capacity and performance of L2/L3 (layer-2/layer-3) exchanges improve ceaselessly, a newly-built broadband access network usually employs Ethernet-based technologies, in other words, the user access device realizes the uplink via an Ethernet interface such as FE/GE and an access convergence network is constructed by employing an Ethernet bridge device. To guarantee user access security and QoS, one or more exclusive VLANs are usually occupied by a user access device At present, the access convergence network constructed via Ethernet bridge devices may have various network topology structures, for example, tree network topology, ring network topology, etc.

In FIG. 2, SW1 to SW6 are ordinary Ethernet bridge devices. The operational principle of an Ethernet bridge device is as follows: a Media Access Control (MAC) address table is generated by learning a port information associated with a MAC address; when a data packet is to be forwarded, the MAC address table is searched according to the destination MAC address in the data packet to obtain an output port corresponding to the destination MAC address; and then the data packet is sent from the output port. If no record in the MAC address table matches the destination MAC address during the search of the MAC address table, the data packet will be broadcasted, in other words, the data packet will be copied for each port of the Ethernet bridge device.

The Ethernet bridge device at the convergence point in the network is, for example, SW1 and SW2 as shown in FIG. 2. The space of the MAC address table thereof must be large enough, so that it may be guaranteed that the MAC addresses of all the users who access via the Ethernet bridge device can be learnt. As shown in FIG. 2, if there are 4000 users to access each of the DSLAMs, the MAC address table of SW1 must be able to support at least 8000 MAC addresses to be learnt, and the MAC address table of SW2 must be able to support at least 12000 MAC addresses to be learnt. If there is no enough space of the MAC address table, the MAC addresses of a part of the users may not be learnt. As a result, the data packets sent to the part of the users can only be broadcasted, so that the network bandwidth will be wasted and instability of the network will increase.

When an access convergence network is built, if a high-level Ethernet bridge device with specific advantages, for example, an Ethernet bridge device including a MAC address table with large space is employed, the networking cost will become very high. If a low-level Ethernet bridge device with lower price and MAC address space less than 8 k is employed for networking, the scale of the network will be limited, so that the networking cost will finally increase due to the limitation of the scale of the network.

SUMMARY OF THE INVENTION

The present invention provides an Ethernet bridge device and a VLAN-based data packet transmission method, thereby lowering the networking cost of the access convergence network by learning a member port corresponding to the VLAN.

The VLAN-based data packet transmission method includes:

a. learning a member port corresponding to a Virtual Local Area Network, VLAN according to a data packet received by an Ethernet bridge device, and storing a correspondence between the VLAN and the learnt member port; and b. forwarding the data packet by the Ethernet bridge device according to the stored correspondence between the VLAN and the member port.

The technical solutions of the method described below are optional technical solutions.

Step a specifically includes:

a1. determining an input port of the Ethernet bridge device for receiving the data packet, and a VLAN ID in the data packet; and a2. determining, by the Ethernet bridge device, a correspondence between the VLAN ID and the member port according to the input port and the VLAN ID in the data packet, and storing the correspondence.

Step a2 specifically includes:

storing, by the Ethernet bridge device, the correspondence between the VLAN ID in the data packet and the input port, when no record matches with the VLAN ID in the data packet in the stored correspondences between VLAN IDs and member ports or no member port in the record matching the VLAN ID of the data packet matches the input port.

Step a2 specifically includes:

modifying, by the Ethernet bridge device, the stored correspondence between the VLAN and the member port to comprise the correspondence between the VLAN ID and the input port when there is the record matching the VLAN ID in the data packet in the stored correspondences between VLAN IDs and member ports, the record includes two member ports and neither of the two member ports is the input port.

Step a2 specifically includes:

not modifying, by the Ethernet bridge device, the stored correspondence between the VLAN and the member port when there is a record matching the VLAN ID of the data packet in the stored correspondences between the VLAN IDs and the member ports, the record includes a member port and the member port is the input port.

Step a2 specifically includes:

not modifying, by the Ethernet bridge device, the stored correspondence between the VLAN and the two member port, when there is a record matching the VLAN ID of the data packet in the stored correspondences between the VLAN IDs and the member ports, the record includes two member ports and one of the two member ports is the input port.

Step a2 specifically includes:

adding, by the Ethernet bridge device, the input port to the stored correspondence between VLAN and member port to comprise the correspondence between the VLAN ID and the input port when there is a record matching the VLAN ID of the data packet in the stored correspondences between VLAN IDs and member ports, the record includes a member port and the member port is not the input port.

Step b specifically includes:

determining, by the Ethernet bridge device, all the ports except for the input port as output ports; and forwarding, by the Ethernet bridge device, the data packet through the output ports.

Step b specifically includes:

determining, by the Ethernet bridge device, the other member port, except for the input port, of the two member ports corresponding to the VLAN ID as an output port of the data packet; and forwarding, by the Ethernet bridge device, the data packet through the output port.

The correspondences between VLANs and member ports are stored in the form of a VLAN ID table; and the VLAN ID table includes a VLAN ID field and a member port field corresponding to the VLAN ID.

The VLAN ID table further includes a field of the number of member ports corresponding to the VLAN ID.

The method further includes:

updating the correspondences between VLANs and member ports stored in the Ethernet bridge device according to a predetermined aging mechanism.

The invention provides an Ethernet bridge device, which includes:

a VLAN learning module for learning a member port corresponding to a VLAN according to a data packet received by the Ethernet bridge device;

a storage module for storing a correspondence between the VLAN and the member port learnt by the VLAN learning module; and a forwarding module for forwarding the data packet according to the correspondence between the VLAN and the member port stored in the storage module.

It can be seen from the description of the above technical solutions that, in the invention, by learning the member port corresponding to the VLAN ID and forwarding a data packet according to the member port corresponding to the VLAN ID, the storage space of the MAC address table of each Ethernet bridge device in the access convergence network only needs to meet the requirement of MAC addresses of local users of the Ethernet bridge device, thus the requirement of the access convergence network on the storage space of the MAC address table of the Ethernet bridge device may be lowered; moreover, the correspondence between the VLAN ID and the member port stored in the Ethernet bridge device of the invention is only related to the number of VLANs in the network, irrespective of the number of users accessing the network, so that more users can access the access convergence network, which is advantageous for expanding the network. Therefore, the networking cost of the access convergence network can be lowered by the technical solutions according to the invention.

DETAILED DESCRIPTION OF THE EMBODIMENTS

Figure 1:
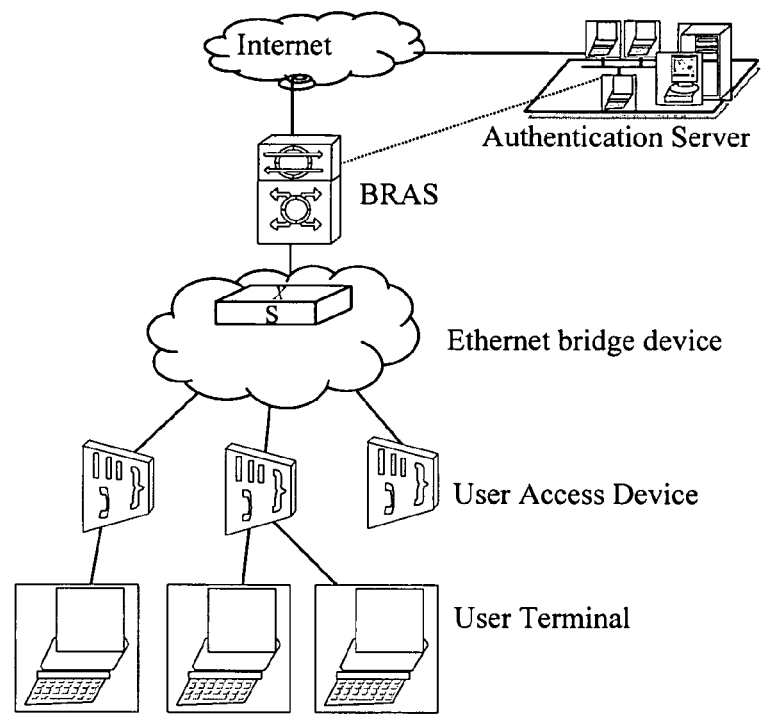
FIG. 1 is a schematic diagram of a network model of a broadband access network.
Figure 2:
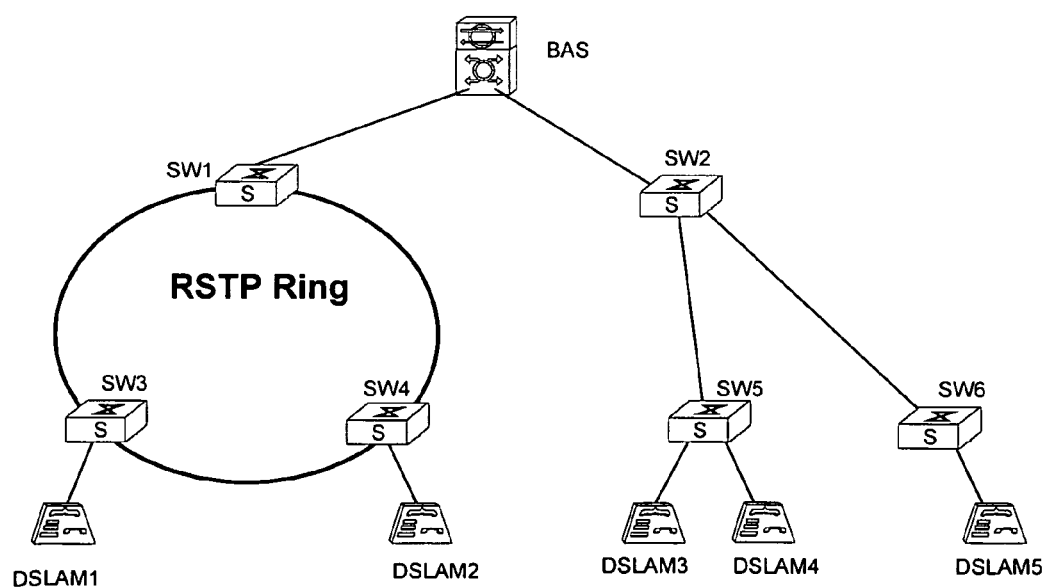
FIG. 2 is a schematic diagram of a network topology structure of an access convergence network.

In an access convergence network, a L2 traffic flow is always based on a point-to-point connection model. For example, the connection between a user terminal and a BRAS or the connection between a user terminal and another user terminal via a L2 private line are a point-to-point connection.

Thus, any VLAN in the access convergence network may be regarded as a point-to-point link. The point-to-point link may be a link for connecting a BRAS and a destination DSLAM or for connecting two DSLAMs.

For each Ethernet bridge device constituting the access convergence network, for example, a LAN Switch device, each of all the VLANs includes at most two physical ports. Therefore, when an Ethernet bridge device forwards a data packet, the Ethernet bridge device only requires to determine the two physical ports associated with each VLAN, the port from which the Ethernet bridge device receive the data packet, and the VLAN of the received data packet, in this way, the Ethernet bridge device may determine the output port of the data packet, so as to implement transmission of the data packet.

Therefore, the conception of the invention lies in that: an Ethernet bridge device is provided to learn the correspondence between a VLAN and member ports of the VLAN; when the Ethernet bridge device needs transmission of a data packet, the Ethernet bridge device may forward the data packet according to the stored correspondence between the VLAN and the member ports. In this way, the storage space of a MAC address table of the Ethernet bridge device only needs to meet the requirement of MAC addresses of local users of the Ethernet bridge device, so as to achieve the decrease in requirements for the storage space of the MAC address table of the Ethernet bridge device in an access convergence network. Moreover, in this disclosure, the above-mentioned correspondence between the VLAN and the member ports, for example, the correspondence between a VLAN ID and the member ports stored in the Ethernet bridge device is only related to the number of VLANs in the network regardless of the number of users accessing the network, so that Ethernet bridge device can provide more users to access the access convergence network, and facilitate the expansion of the network. As a result, the networking cost of the access convergence network may decrease.

A VLAN-based data packet transmission method and Ethernet bridge device according to the invention will be further described based on the conception of the invention.

The Ethernet bridge device according to the invention includes a DSLAM, LAN Switch, etc.

The Ethernet bridge device according to the invention includes a VLAN learning module, a storage module and a forwarding module.

The VLAN learning module is mainly adapted to learn a member port corresponding to a VLAN ID according to a data packet received by the Ethernet bridge device, and to store the correspondence between the learnt VLAN ID and member port in the storage module.

The forwarding module is mainly adapted to forward the data packet received by the Ethernet bridge device according to the correspondences between the VLANs and the member ports stored in the storage module.

The correspondences between the VLANs and the member ports learnt by the Ethernet bridge device according to the invention may be stored in the form of a VLAN_ID table, which is as shown in Table 1.

TABLE 1

| VLAN ID | Member Port | Number of Learnt Ports (Optional) |
|---|---|---|
| 1 | A | 2 |
|   | B |   |
| 2 | C | 1 |
| ... | ... | ... |
| N | / | 0 |

The VLAN_ID table as shown in Table 1 mainly includes three fields, i.e., a VLAN ID field, a Member Port field for recording member ports corresponding to a VLAN ID, and a Number of Learnt Ports field for recording the number of member ports corresponding to a VLAN ID learnt by the Ethernet bridge device. The Number of Learnt Ports field may be an optional field; in other words, the VLAN_ID table may not include this field.

In the VLAN_ID table, the VLAN ID is used to bridge and forward a data packet instead of the MAC address. The VLAN learning module of the Ethernet bridge device is adapted to learn a VLAN ID in the port corresponding to a VLAN. If the port corresponding to the VLAN ID is learnt to be an activated port, the activated port is a member port of the VLAN ID. The member port of the VLAN ID learnt by the VLAN learning module should be stored in the storage module. When a VLAN ID stored in the storage module corresponds to two activated ports, the forwarding module of the Ethernet bridge device may forward a data packet between the two activated ports in a unicast mode. When a VLAN ID corresponds to one activated port or when the VLAN ID has no corresponding activated port, the forwarding module of the Ethernet bridge device forwards the data packet with the VLAN ID in a diffusion mode.

The VLAN learning module of the Ethernet bridge device learns the member port corresponding to the VLAN ID in the following manner.

The VLAN learning module receives a data packet from a predetermined port and determines the VLAN ID of the data packet as n; and the VLAN learning module searches a VLAN_ID table stored in the storage module for a record matching the VLAN ID n according to the VLAN ID n in the data packet.

The VLAN learning module determines whether the record matching the VLAN ID n in the VLAN_ID table includes a member port or not, and if the record matching the VLAN ID n in the VLAN_ID table does not include any member port, the record matching the VLAN ID n in the VLAN_ID table in the storage module is modified so that the predetermined port is added to the record matching the VLAN ID n. At this point, the forwarding module determines the ports of the Ethernet bridge device other than the predetermined port as output ports according to the modified record matching the VLAN ID n in the VLAN_ID table stored in the storage module, and forwards the data packet through the above output ports in a diffusion mode.

If the record matching the VLAN ID n in the VLAN_ID table includes at least a member port, the VLAN learning module continues to determine the number of member ports included in the above record. If the record includes two member ports, it further determines whether one of the two member ports is the predetermined port. If neither of the two member ports is the predetermined port, the record matching the VLAN ID n in the VLAN_ID table stored in the storage module is modified so that the member port in the record matching the VLAN ID n only includes the predetermined port. At this point, the forwarding module determines the ports of the Ethernet bridge device other than the predetermined port as output ports according to the modified record matching the VLAN ID n in the VLAN_ID table stored in the storage module, and forwards the data packet through the above output ports in a diffusion mode.

If one of the two member ports is the predetermined port, the VLAN learning module does not modify the record matching the VLAN ID n in the VLAN_ID table stored in the storage module. At this point, the forwarding module takes the other member port in the record except for the predetermined port as an output port of the data packet according to the record matching the VLAN ID n in the VLAN_ID table stored in the storage module, and forwards the data packet through the above output port.

If the record matching the VLAN ID n in the VLAN_ID table includes one member port, the VLAN learning module further determines whether the member port in the record is the predetermined port. If the member port is not the predetermined port, the record matching the VLAN ID n is modified, in other words, a predetermined port is added to the record matching the VLAN ID n, so that the record has two member ports. At this point, the forwarding module takes the other member port in the record except for the predetermined port as an output port of the data packet according to the modified record matching the VLAN ID n in the VLAN_ID table stored in the storage module, and forwards the data packet through the above output port.

If the record matching the VLAN ID n in the VLAN_ID table includes one member port and the member port is the predetermined port, the VLAN learning module does not modify the record matching the VLAN ID n in the VLAN_ID table stored in the storage module. At this point, the forwarding module determines the ports of the Ethernet bridge device other than the predetermined port as output ports according to the record matching the VLAN ID n in the VLAN_ID table stored in the storage module, and forwards the data packet through the above output ports in a diffusion mode.

A VLAN-based data packet transmission method in an Ethernet bridge device according to the invention will be explained in detail in conjunction With FIG. 3.

Figure 3:
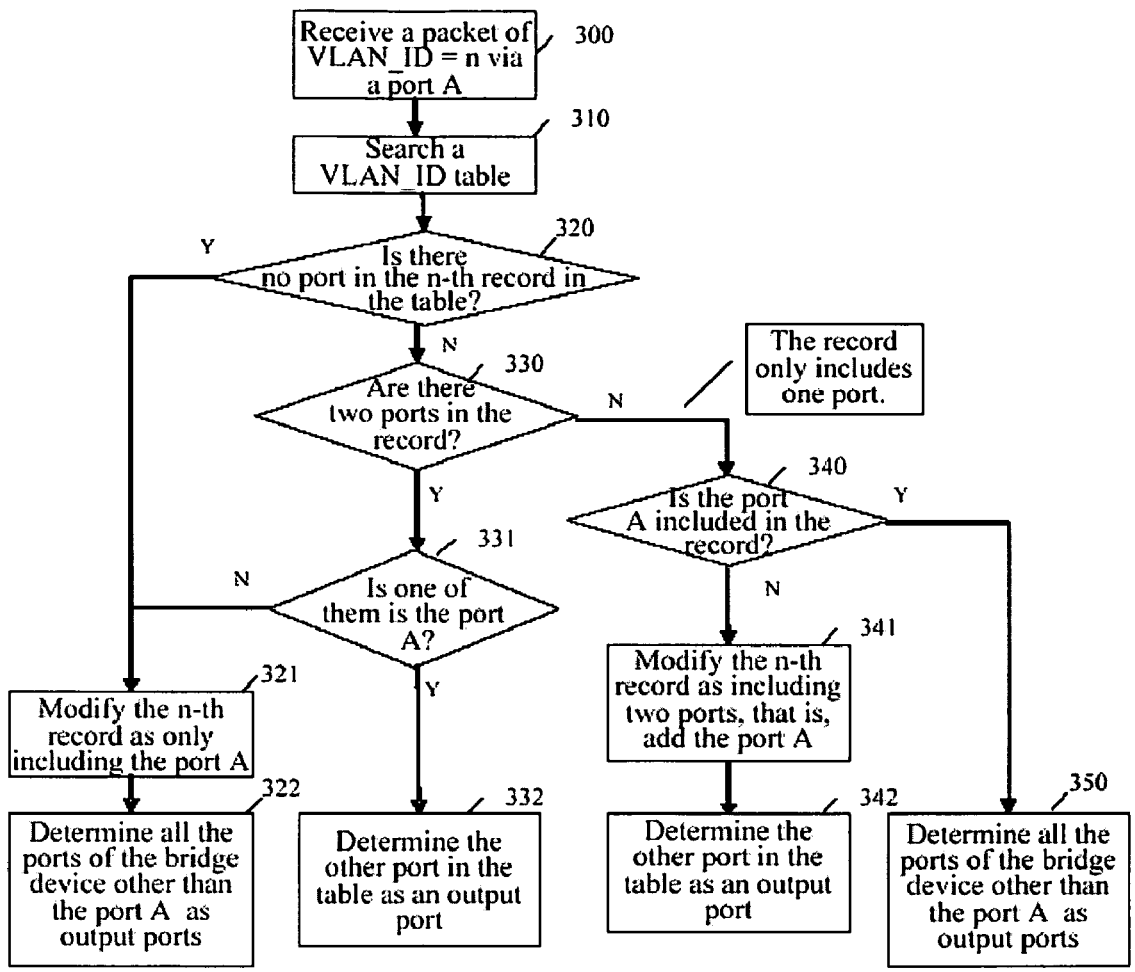
FIG. 3 is a flow chart of a VLAN-based data packet transmission method according to the invention.

In FIG. 3, at Step 300, the Ethernet bridge device receives a data packet through a port A thereof, and the Ethernet bridge device determines a VLAN ID in the data packet as n.

At Step 310, the Ethernet bridge device searches a VLAN_ID table for a record matching the VLAN ID n according to the VLAN ID n in the data packet.

At Step 320, the Ethernet bridge device determines whether the record matching the VLAN ID n in the VLAN_ID table includes a member port, if the record matching the VLAN ID n in the VLAN_ID table does not include any member port, at Step 321, the record matching the VLAN ID n in the VLAN_ID table is modified so that the port A is added to the record.

At Step 322, the Ethernet bridge device determines the ports of the Ethernet bridge device other than the port A as output ports, and diffusively forwards the data packet through the above output ports.

If, at Step 320, the record matching the VLAN ID n in the VLAN_ID table includes at least a member port, at Step 330, the Ethernet bridge device continues to determine the number of member ports included in the above record. If the record includes two member ports, then at Step 331, the Ethernet bridge device further determines whether one of the two member ports is the port A, and if neither of the two member ports is the port A, at Step 321, the Ethernet bridge device modifies the record matching the VLAN ID n in the VLAN_ID table so that the member port in the record only includes the port A.

Then, at Step 322, the Ethernet bridge device determines the ports of the Ethernet bridge device other than the port A as output ports, and diffusively forwards the data packet through the above output ports.

If, at Step 331, one of the two member ports is the port A, then at Step 332, the Ethernet bridge device does not modify the record matching the VLAN ID n in the VLAN_ID table, takes the other member port in the record except for the port A as an output port of the data packet, and forwards the data packet through the above output port.

If, at Step 330, the record includes one member port, then at Step 340, the Ethernet bridge device further determines whether the member port in the record is the port A or not, and if the member port is not the port A, at Step 341, the record matching the VLAN ID n is modified, in other words, the port A is added to the record, so that the record has two member ports.

At Step 342, the Ethernet bridge device takes the other member port in the record except for the port A as an output port of the data packet, and forwards the data packet through the above output port.

If at Step 340, the member port is the port A, then at Step 343, the Ethernet bridge device does not modify the record matching the VLAN ID n in the VLAN_ID table, determines the ports of the Ethernet bridge device other than the port A as output ports, and diffusively forwards the data packet through the above output ports.

In the description of the above process, if the VLAN_ID table includes a Number of Learnt Ports field for recording the number of learnt member ports corresponding to the VLAN ID, the number of the member ports may be determined according to the content of the field. If the VLAN_ID table does not include such a field of the number of learnt member ports corresponding to the VLAN ID, the number of the member ports may be determined according to the content of the member port field.

When the VLAN_ID table includes a field of the number of learnt member ports corresponding to the VLAN ID and the port A is added as a member of the ports, the content of the field of the number of learnt member ports corresponding to the VLAN ID needs to be modified correspondingly.

To improve the network adaptability, an aging mechanism is introduced to the VLAN_ID table. For example, an aging mechanism for a MAC address table in the traditional Ethernet bridge device may be introduced. In the invention, when an Ethernet bridge device has not received, through a member port thereof, a data packet of a VLAN ID corresponding to the member port after a long time, a member port corresponding to the VLAN ID in the VLAN_ID table may be deleted.

Although the invention has been described with respect to the embodiments thereof, those skilled in the art would appreciate that various modifications and variations may be made without departing from the spirit or scope of the invention as defined by the appended claims and their equivalents.

The invention claimed is:

1. A Virtual Local Area Network (VLAN) based data packet transmission method, comprising:
receiving a data packet from an input port of an Ethernet bridge device;
determining a VLAN ID in the data packet;
searching a VLAN ID table for a record matching the VLAN ID, wherein the VLAN ID table stores correspondences between VLANs and member ports, and each of the VLANs comprises at most two member ports;
if the record matching the VLAN ID includes no member port, or if the record matching the VLAN ID includes two member ports and neither of the two member ports is the input port, modifying, by the Ethernet bridge device, the record matching the VLAN ID in the VLAN ID table to include only the input port as a member port;
if the record matching the VLAN ID includes one member port and the one member port is not the input port, modifying, by the Ethernet bridge device, the record matching the VLAN ID in the VLAN ID table to include first and second member ports, the first member port being the input port;
if the record matching the VLAN ID includes the input port, not modifying the VLAN ID table; and
forwarding the data packet by the Ethernet bridge device according to the stored correspondences between the VLANs and the member ports in the VLAN table.

2. The method according to claim 1, wherein not modifying the VLAN ID table comprises:
not modifying, by the Ethernet bridge device, the record matching the VLAN ID in the VLAN ID table, the record including one member port and the one member port is the input port.

3. The method according to claim 1, wherein not modifying the VLAN ID table comprises:
not modifying, by the Ethernet bridge device, the record matching the VLAN ID in the VLAN ID table, the record including two member ports and one of the two member ports is being the input port.

4. The method according to claim 3, wherein forwarding the data packet comprises:
determining, by the Ethernet bridge device, if the record matching the VLAN ID includes the input port and a second member port, the second member port, as an output port of the data packet; and
forwarding, by the Ethernet bridge device, the data packet through the output port.

5. The method according to claim 1, wherein forwarding the data packet comprises:
determining, by the Ethernet bridge device, all ports of the Ethernet bridge device other than the input port as output ports, if the record matching the VLAN ID includes only the input port; and
forwarding, by the Ethernet bridge device, the data packet through the output ports.

6. The method according to claim 1, wherein
the VLAN ID table comprises a VLAN ID field and a member port field corresponding to the VLAN ID.

7. The method according to claim 6, wherein the VLAN ID table further comprises a field of number of member ports corresponding to the VLAN ID.

8. The method according to claim 1, further comprising:
updating the correspondences between VLANs and member ports stored in the Ethernet bridge device according to a predetermined aging mechanism.

9. An Ethernet bridge device, comprising:
a Virtual Local Area Network (VLAN) learning module configured to learn a member port corresponding to a VLAN ID according to a data packet received by the Ethernet bridge device;
a storage module configured to store correspondences between VLANs and member ports in a VLAN ID table, wherein each of the VLANs comprises at most two member ports; and
a forwarding module configured to forward the data packet according to the correspondences between the VLANs and the member ports stored in the storage module;
wherein the VLAN learning module is further configured to:
  receive the data packet from an input port of the Ethernet bridge device;
  determine the VLAN ID in the data packet;
  search the VLAN ID table for a record matching the VLAN ID;
  if the record matching the VLAN ID includes no member port, or if the record matching the VLAN ID includes two member ports and neither of the two member ports is the input port, modify, by the Ethernet bridge device, the record matching the VLAN ID in the VLAN ID table to include only the input port as a member port;
  if the record matching the VLAN ID includes one member port and the one member port is not the input port, modify, by the Ethernet bridge device, the record matching the VLAN ID in the VLAN ID table to include first and second member ports, the first member port being the input port; and
  if the record matching the VLAN ID includes the input port, not modify the VLAN ID table.

10. The Ethernet bridge device according to claim 9, wherein the storage module is further configured to store the VLAN ID table including a VLAN ID field and a member port field for recoding member ports corresponding to a VLAN ID.

11. The Ethernet bridge device according to claim 10, wherein the storage module is further configured to store the VLAN ID table including a field of number of member ports for recording a number of member ports corresponding to a VLAN ID learnt by the Ethernet bridge device.

12. The Ethernet bridge device according to claim 10, wherein if the modified record has one member port, the forwarding module is further configured to designate ports of the Ethernet bridge device other than the input port as output ports for the data packet according to the modified record, and to forward the data packet through the output ports in a diffusion mode.

13. The Ethernet bridge device according to claim 12, wherein if the modified record has two member ports including the input port, the forwarding module is further configured to designate the member port other than the input port as an output port for the data packet according to the modified record, and to forward the data packet through the output port in a diffusion mode.

* * * * *

UNITED STATES PATENT AND TRADEMARK OFFICE
CERTIFICATE OF CORRECTION

PATENT NO. : 7,756,147 B2
APPLICATION NO. : 12/010691
DATED : July 13, 2010
INVENTOR(S) : Shifa Zhang et al.

It is certified that error appears in the above-identified patent and that said Letters Patent is hereby corrected as shown below:

\* On the Title Page, Item (75), in the "Inventors", lines 1-4,
"Shifa Zhang, Guangdong (CN); Zhijun Qu, Guangdong (CN); Wumao Chen, Guangdong (CN); Qiao Li, Quangdong (CN)"
should read
--Shifa Zhang, Shenzhen (CN); Zhijun Qu, Shenzhen (CN); Wumao Chen, Shenzhen (CN); Qiao Li, Shenzhen (CN)--.

\* On the Title Page, after Item (63), the "Related U.S. Application Data", and before Item (51), the "Int. Cl." data, insert the following missing data:
--(30)    Foreign Application Priority Data
   July 29, 2005    (CN)...........200510088641.8--.

\* In claim 4, column 8, line 49, "port,as" should read --port as--.

In claim 10, column 10, line 10, "recoding" should read --recording--.

Signed and Sealed this

Fifth Day of October, 2010

David J. Kappos
*Director of the United States Patent and Trademark Office*